(12) United States Patent
Trausch

(10) Patent No.: US 7,051,418 B2
(45) Date of Patent: May 30, 2006

(54) METHOD OF MEASURING WEAK GAS FLOWS

(75) Inventor: Günter Trausch, München (DE)

(73) Assignee: Siemens Aktiengesellschaft, Munich (GB)

( * ) Notice: Subject to any disclaimer, the term of this patent is extended or adjusted under 35 U.S.C. 154(b) by 162 days.

(21) Appl. No.: 10/641,263

(22) Filed: Aug. 14, 2003

(65) Prior Publication Data

US 2004/0031320 A1 Feb. 19, 2004

Related U.S. Application Data

(60) Division of application No. 09/968,276, filed on Oct. 1, 2001, now abandoned, which is a continuation of application No. PCT/DE00/00890, filed on Mar. 23, 2000.

(30) Foreign Application Priority Data

Mar. 31, 1999 (DE) ................................ 199 14 712

(51) Int. Cl.
*G01R 31/28* (2006.01)
*G05F 31/28* (2006.01)
*H01H 31/28* (2006.01)

(52) U.S. Cl. ...................... 29/593; 29/592.1; 29/602.1; 73/159; 73/204.11; 73/204.17; 73/204.26; 156/268; 156/344; 216/39; 216/41; 216/56; 438/455; 438/458; 438/976

(58) Field of Classification Search ............... 29/592.1, 29/593, 602.1; 73/159, 204.11, 204.17, 204.26; 156/268, 344; 216/39, 41, 56; 438/455, 438/458, 976

See application file for complete search history.

(56) References Cited

U.S. PATENT DOCUMENTS

| | | | |
|---|---|---|---|
| 4,074,566 A | 2/1978 | Obayashi et al. | ............. 73/116 |
| 4,651,564 A | 3/1987 | Johnson et al. | ............... 73/204 |
| 4,682,503 A | 7/1987 | Higashi et al. | ............... 73/755 |
| 4,685,331 A | 8/1987 | Renken et al. | ............... 73/204 |
| 4,691,566 A | 9/1987 | Aine | ........................... 73/204 |
| 4,909,078 A | 3/1990 | Sittler et al. | ............. 73/204.26 |

(Continued)

FOREIGN PATENT DOCUMENTS

DE 1 573 098 12/1971

(Continued)

OTHER PUBLICATIONS

"Flexible integration of nonsilicon microstructures on microelectronic circuits"; Muller, K.-D.; Bacher, W.; Heckele, M.; The Eleventh Annual International Workshop on Jan. 25-29, 1998; pp. :263-267.*

*Primary Examiner*—Paul D. Kim
(74) *Attorney, Agent, or Firm*—Laurence A. Greenberg; Werner H. Stemer; Ralph E. Locher

(57) ABSTRACT

Firstly, a supporting frame is produced, whose opening is spanned by an auxiliary layer flush on one side. Following the production of microstructures, flat parts or membranes on the common plane defined by the auxiliary layer and the supporting frame, the auxiliary layer is removed, preferably by etching. In a preferred application, the self-supporting microstructures produced in accordance with the method of the invention are used as electrically heatable resistance grids in a device for measuring weak gas flows.

6 Claims, 4 Drawing Sheets

U.S. PATENT DOCUMENTS

| | | | | |
|---|---|---|---|---|
| 4,925,723 A | * | 5/1990 | Bujatti et al. | 428/137 |
| 4,966,037 A | | 10/1990 | Sumner et al. | 73/204.26 |
| 5,585,554 A | | 12/1996 | Handfield et al. | 73/146.5 |
| 5,840,402 A | * | 11/1998 | Roberts et al. | 428/131 |
| 6,060,782 A | * | 5/2000 | Ohsono et al. | 257/738 |
| 6,129,855 A | * | 10/2000 | Sawada et al. | 216/22 |

FOREIGN PATENT DOCUMENTS

| | | |
|---|---|---|
| EP | 0 405 637 A2 | 1/1991 |
| EP | 0 483 662 A2 | 5/1992 |
| JP | 04005531 A * | 1/1992 |
| JP | 06 116 101 | 5/1996 |

* cited by examiner

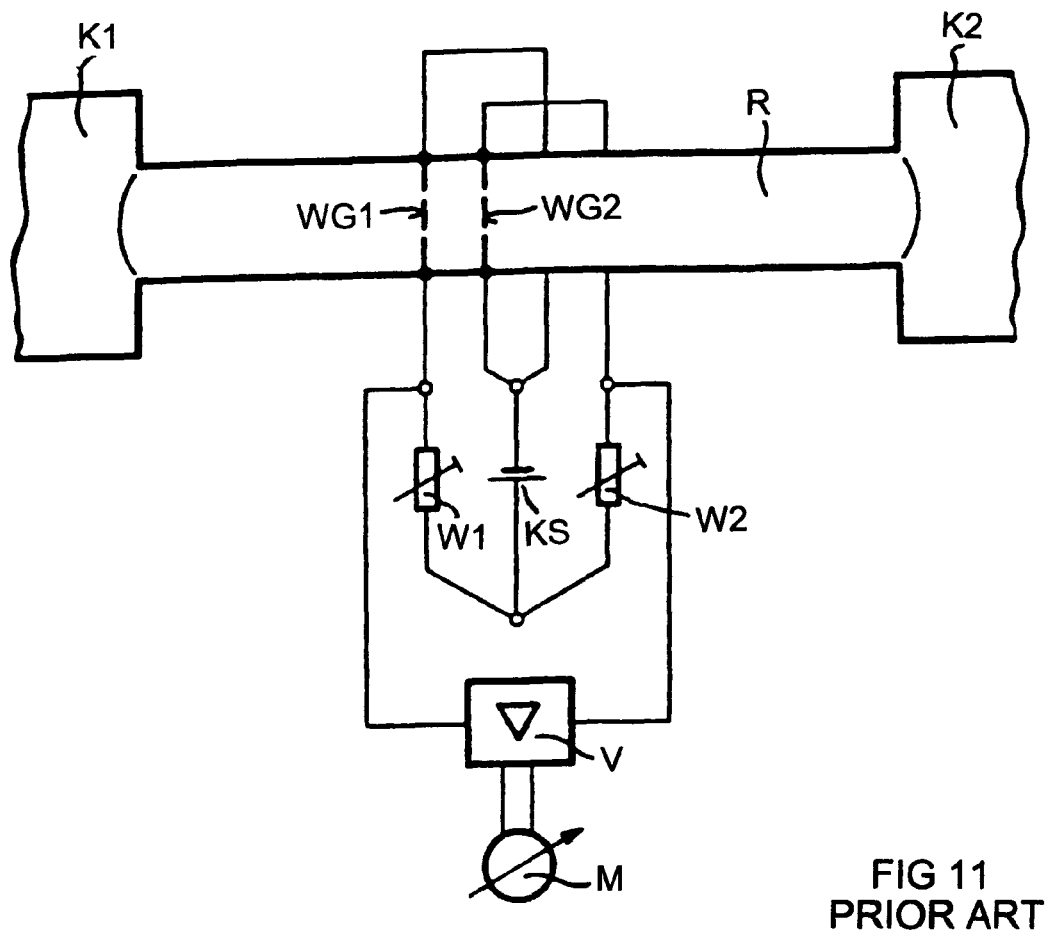
FIG 11
PRIOR ART
FIG 12
PRIOR ART
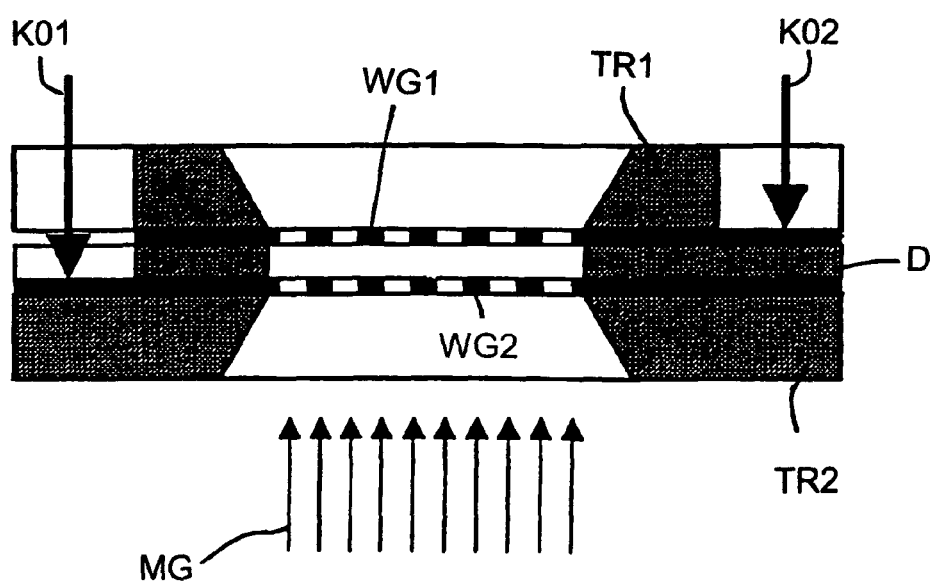

METHOD OF MEASURING WEAK GAS FLOWS

CROSS-REFERENCE TO RELATED APPLICATION

This is a divisional of application Ser. No. 09/968,276, filed Oct. 1, 2001, now abandoned, which is herewith incorporated by reference in its entirety, which was a continuation of copending International Application PCT/DE00/00890, filed Mar. 23, 2000, which designated the United States and which was not published in English.

BACKGROUND OF THE INVENTION

Field of the Invention

Flat parts with thicknesses below 20 μm present problems both during manufacture and during handling and mounting, because of their low strength. Thin flat parts of this type are used, for example, as optical aperture stops, as aperture stops for corpuscular beams, or as evaporation stencils for vacuum metallizations.

Self-supporting microstructures with thicknesses below 20 μm are used, inter alia, as functional parts in sensors or activators. For example, in a device disclosed in German patent DE 15 73 098 for measuring weak gas flows, self-supporting microstructures in the form of flat grids are required. They are arranged in a tube at right angles to the flow direction of the gas. Similar grids in a detector measuring the flow of fluids are disclosed in U.S. Pat. No. 4,909,078.

In electronic circuits, electrical signals are increasingly distorted with increasing frequency as a result of the capacitive and inductive interaction between lines, insulation layers and circuit substrates. For this reason, substrates in the shape of membranes a few micrometers thick are desirable for high-frequency circuits. During the production and handling of such membranes, the same problems arise as in the production and handling of self-supporting microstructures or of thin flat parts.

Nozzles, aperture stops and functional parts in sensors and actuators can be produced by anisotropic and selective etching of silicon. Use is made thereby of the fact that specific etching media, such as hot potassium hydroxide solution, have a preferred etching direction oriented to the crystal structure, and the doped regions and silicon dioxide can be etch-resistant. This technique requires expensive equipment and is restricted to silicon materials. Even high-frequency circuits can be built up on fragile silicon membranes.

European patent EP 0 483 662 discloses a method of producing self-supporting microstructures wherein a sacrificial layer is applied to a substrate and the microstructures are then built up on this sacrificial layer. A supporting frame is then applied to the microstructures, the sacrificial layer with the microstructures and the supporting frame then being lifted off the substrate and the sacrificial layer then being removed. This method has the advantage that self-supporting microstructures can be produced, and that these microstructures are stabilized by the sacrificial layer and the solid supporting frame as they are separated from the substrate, so that undesirable changes in the shape of the microstructures, caused by being separated from the substrate, may be avoided.

Patent Abstracts of Japan, Vol. 1996, No. 09, Sep. 30, 1996 and JP-A-08 116101 disclose a further method of producing self-supporting microstructures, wherein first of all the opening in a supporting frame is filled with potassium bromide powder and the powder is then solidified by means of fusing. After the evening and polishing of the upper side of the potassium bromide filling, the microstructures are then constructed on the upper side of the supporting frame and potassium bromide filling, the potassium bromide then being dissolved out with water. Because of the water solubility of the potassium bromide, aqueous processes such as the deposition of metal by electroplating cannot be used to form the microstructures.

SUMMARY OF THE INVENTION

It is accordingly an object of the invention to provide a method of producing self-supporting microstructures, thin flat parts or membranes, and useful applications of microstructures produced by the method as resistance grids in a device for measuring weak gas flows, which overcomes the above-mentioned disadvantages of the heretofore-known devices and methods of this general type and which, while maintaining the advantages of a supporting frame, permits the simple and economic production of the microstructures, flat parts or membranes.

With the foregoing and other objects in view there is provided, in accordance with the invention, a method of producing self-supporting microstructures, thin flat parts, or membranes, which comprises:

a) providing a supporting frame with at least one opening;
b) applying an adhesive film to the supporting frame such that the adhesive film spans the opening in the supporting frame flatly;
c) applying an auxiliary layer to an underside of the adhesive film and adjacent regions of the supporting frame such that the auxiliary layer spans the opening in the supporting frame on one side flush with the supporting frame;
d) removing the adhesive film;
e) constructing component elements selected from the group consisting of microstructures, flat parts, and membranes on the common plane comprising the auxiliary layer and the supporting frame; and
f) removing the auxiliary layer formed in step c).

The invention is based on the finding that the microstructures, flat parts or membranes can be produced directly on a support which is flat on one side and comprises a supporting frame and an auxiliary layer spanning the opening in the supporting frame. Here, the production of the auxiliary layer is made easier by the temporary use of an adhesive film. The auxiliary layer can then be removed in such a way that the microstructures, flat parts or membranes remain directly on the stable supporting frame, without any impairment to their dimensional accuracy or edge quality.

In accordance with an added feature of the invention, prior to applying the adhesive film to the supporting frame, a rear surface of the adhesive film is laminated onto an auxiliary carrier. With this, bowing or damage to the adhesive film can be avoided, even in the case of large spanning widths.

In accordance with an additional feature of the invention, a photoresist film is used as an adhesive film. The photoresist is distinguished by good adhesion to various types of materials of the supporting frame, and by a smooth, fault-free surface. Such photoresist films can be cured, i.e., hardened, in a simple way by means of UV radiation after being applied to the supporting frame. In accordance with another feature of the invention, the photoresist film can be dissolved in an organic solvent or in a weak hydroxide solution without impairing the auxiliary layer.

In accordance with a further feature of the invention, the auxiliary layer is applied to the underside of the adhesive film and the adjacent regions of the supporting frame by means of chemical metal deposition and subsequent reinforcement by electroplating. This refinement permits the rapid and economic production of the auxiliary layer by means of chemical metal deposition and subsequent reinforcement by electroplating.

In accordance with again a further feature of the invention, the step of applying the auxiliary layer to the underside of the adhesive film and the adjacent regions of the supporting frame comprises vapor depositing metal in vacuum and subsequently reinforcing by electroplating. In this refinement, similarly beneficial production of the auxiliary layer can also be achieved by means of the vapor deposition of metal in vacuum and subsequent reinforcement by electroplating.

Again an added beneficial development that permits the simple and economic additive construction of microstructures by means of metal deposition by electroplating. Preferably, this additive construction of the microstructures is made possible even in the case of supporting frames which consist of an electrically insulating material. Economic production of microstructures is also made possible in a subtractive way, however, by means of structuring layers applied to the entire area.

In accordance with yet a further development of the invention, the microstructures can be produced in two planes. In this way, it is possible to produce, for example, crossed families of webs which are located one above another at a short distance.

A further refinement permits extremely gentle removal of the auxiliary layer by means of etching. If a spacer layer is used, this can then likewise be removed gently by means of etching in a similar way.

In accordance with yet again an added feature of the invention, the above step c) comprises applying a membrane to the common plane comprising the auxiliary layer and the supporting frame, and, prior to removing the auxiliary layer in step f), producing circuit elements on the membrane. This development permits the simple production of circuits on self-supporting dielectric membranes.

In accordance with yet again an additional feature of the invention, circuit elements are produced on the common plane formed by the auxiliary layer and the supporting frame, and a membrane embedding the circuit elements is subsequently applied. This is an alternative production of circuits on self-supporting dielectric membranes, wherein the circuit elements are embedded into the dielectric membrane from three sides. If, then, the circuit is composed as usual of a multilayer construction, for example a sequence of layers: adhesive layer, diffusion barrier and conductive layer, then in the case of this variant, one or more layers can be etched away again. In this way it is possible, for example, to produce circuit elements of pure gold on the dielectric membrane.

With the above and other objects in view there is also provided, in accordance with the invention, an assembly of self-supporting microstructures produced in accordance with the above-outlined method and configured as electrically heatable resistance grids in a device for measuring weak gas flows. The resistance grids produced in this way, as compared with resistance grids produced conventionally, have a higher uniformity among themselves, as a result of which, for example, the drive electronics can be simplified.

The resistance grids produced in accordance with the invention in addition permit stronger signals and therefore more accurate measurements. The method according to the invention also permits the production of the resistance grids in a multiple arrangement, and therefore a considerable reduction in the production costs.

In accordance with again an added feature of the invention, the resistance grids are disposed to come in thermal contact with the gas flow through the device, and which further comprises a bridge circuit with the resistance grids connected therein, the bridge circuit having a first diagonal with a constant current source and a second diagonal with instruments configured to process measured values or display measured values.

In accordance with again an additional feature of the invention, the device has a first chamber and a second chamber and a connecting tube therebetween, and the resistance grids are disposed in the connecting tube between the first chamber and the second chamber and are arranged at right angles to a flow direction at a distance from each other.

In accordance with again another feature of the invention, the resistance grids are formed with a serpentine configuration.

In accordance with again a further feature of the invention, a frame-type spacer is arranged between the resistance grids and defining a distance therebetween.

In accordance with a concomitant feature of the invention, supporting frames of glass are provided for supporting the resistance grids.

Other features which are considered as characteristic for the invention are set forth in the appended claims.

Although the invention is illustrated and described herein as embodied in a method of producing self-supporting microstructures, thin flat parts or membranes, and use of microstructures produced by this method as resistance grids in a device for measuring weak gas flows, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 11 shows a prior art device for measuring weak gas flows in a very simplified schematic illustration;

FIG. 12 shows a section through the two resistance grids used in the device according to FIG. 11;

DESCRIPTION OF THE PREFERRED EMBODIMENTS

Figure 1:
FIG. 1 to FIG. 4 are partial sectional views illustrating various method stages in the production of a supporting frame, whose opening is spanned by an auxiliary layer flush on one side.

Referring now to the figures of the drawing in detail and first, particularly, to FIG. 1 thereof, there is shown a cross section through a supporting frame 1, which consists of a thin flat plate provided with an opening 10. The starting material may be, for example, sheet metal, plastic, glass, or ceramic. It is possible for the opening 10 to be produced, for example, by means of milling, chemical etching, laser cutting, punching, or the like.

Figure 2:
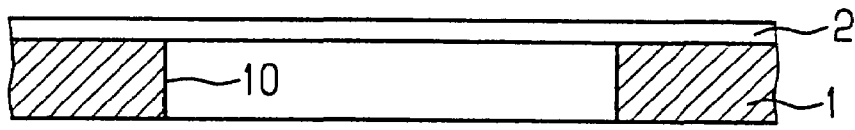

According to FIG. 2, the supporting frame 1 shown in FIG. 1 is covered on one side with an adhesive film 2 in such a way that its opening 10 is spanned flatly. The adhesive film 2 is a photoresist film as is otherwise used in printed circuit board technology. These initially thermoplastic photopolymer films adhere well to an extremely wide range of materials, have a smooth, fault-free surface and are cured by the action of UV radiation. The lamination is carried out with appliances which are common on the market, although the heated roll should be hard in order that the photoresist film applied is not bowed. For instance, heated rolls consisting of metal are suitable.

Figure 3:
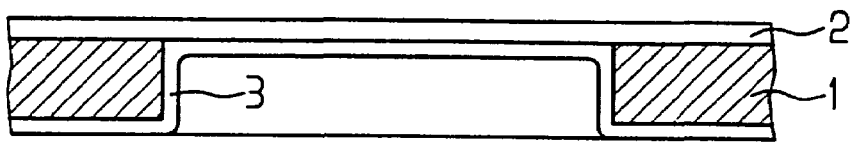

To the composite illustrated in FIG. 2 and comprising supporting frame 1 and adhesive film 2, according to FIG. 3 a self-supporting, metallic auxiliary layer 3 is then applied, in particular in the area of the opening 10 from the underside by means of chemical metal deposition and subsequent reinforcement by electroplating. It can be seen that the auxiliary layer 3 spans the opening 10 (cf. FIGS. 1 and 2) in the supporting frame 1 on one side, flush with the upper side of the supporting frame 1.

Figure 4:
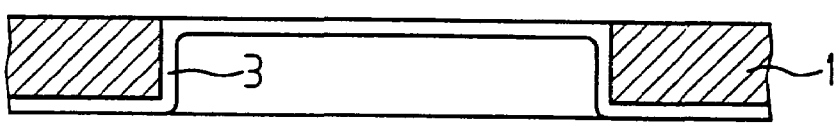

FIG. 4 shows the assembly comprising supporting frame 1 and auxiliary layer 3 after the removal of the adhesive film 2. The removal of the photoresist film used as the adhesive film 2 is carried out in an organic solvent or in a weak hydroxide solution.

Figure 5:
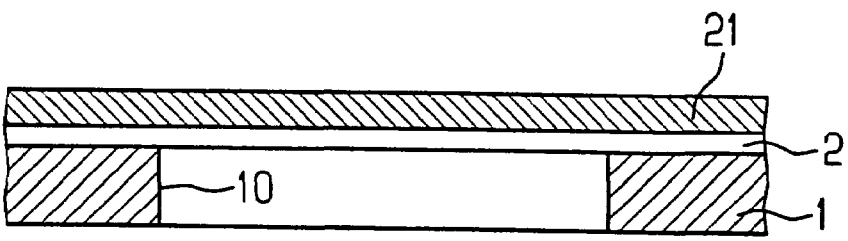
FIG. 5 is a similar view showing a variant wherein an adhesive film reinforced with an auxiliary support is used.

In order that no bowing or damage occurs in the case of large spanning widths of the adhesive film 2, use can be made of a double-sided adhesive film 2, which is first laminated onto a flat auxiliary support 21 and is then applied together with the latter to the supporting frame 1, according to FIG. 5. Here, too, the adhesive film 2 used is again a photoresist film. If, after the application of the auxiliary layer 3 (cf. FIG. 3), the separation of the adhesive film 2 proves to be undesirably lengthy, then a solvent-permeable auxiliary carrier 21 can be used, for example board. However, it then has to be protected during the previous wet processes, by being covered with a second film, which is not shown in the drawing for purposes of clarity and simplicity.

If the auxiliary layer 3 in the opening 10 in the supporting frame 1 is not excessively thin and the adhesion of the adhesive film 2 to the supporting frame 1 is not excessively high, then the auxiliary carrier 21 can also be lifted off mechanically. For example, the adhesion of photoresist films can be controlled by means of their degree of plasticization during the lamination, that is to say via the temperature. Reduced adhesion can also be achieved by means of thin release layers such as polyvinyl alcohol.

Figure 6:
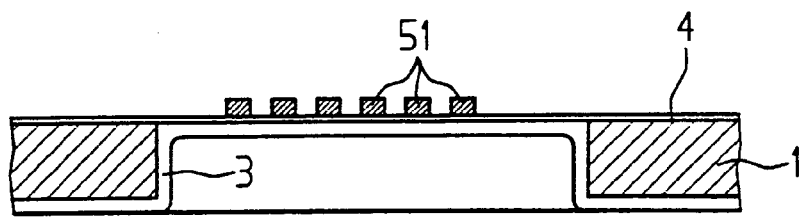
FIG. 6 shows the production of microstructures on a conductive layer.

FIG. 6 shows an assembly corresponding to FIG. 4 comprising supporting frame 1 and auxiliary layer 3. The supporting frame 1 here is formed of electrically nonconductive material. The auxiliary layer 3 can consist of electrically conductive or of electrically nonconductive material. In order to prepare the outlined assembly for the production of microstructures, a conductive layer 4, that is to say a thin layer of electrically conductive material, is applied to the common plane comprising auxiliary layer 3 and supporting frame 1. Then, the conductive layer 4 has applied to it a galvanoresist which is not shown in FIG. 6 but is structured photolithographically in such a way that the conductive layer 4 is exposed in the area of the subsequent microstructures. The microstructures 51 shown in FIG. 6 can then be built up additively, that is to say by means of metal deposition by electroplating. Then, following the stripping of the galvanoresist and following the removal of the auxiliary layer 3, the conductive layer 4 can be removed by etching. In the process, only those areas of the conductive layer 4 which are located between the microstructures 51 and the supporting frame 1 are maintained.

If the supporting frame 1 and the auxiliary layer 3 consist of electrically conductive materials, in particular metal, then the microstructures 51 can be produced with the conductive layer 4 being omitted. For the case wherein the microstructures 51 are to be electrically decoupled from the supporting frame 1, before the conductive layer 4 is applied, an insulating layer, not shown in FIG. 6, is applied to the common plane comprising auxiliary layer 3 and supporting frame 1.

The microstructures 51 illustrated in FIG. 6 can also be produced subtractively, as metallic or nonmetallic structures from layers applied to the entire area. The structuring of these layers is performed, for example, by applying an etch resist and subsequently etching. Laser structuring is likewise possible. In the case of wet chemical etching, either the materials must be selected in such a way that the etching is possible selectively or, by means of an intermediate layer and by covering the rear of the assembly comprising the auxiliary layer 3 and the supporting frame 1, the assembly must be protected from the etching solution.

Figure 7:
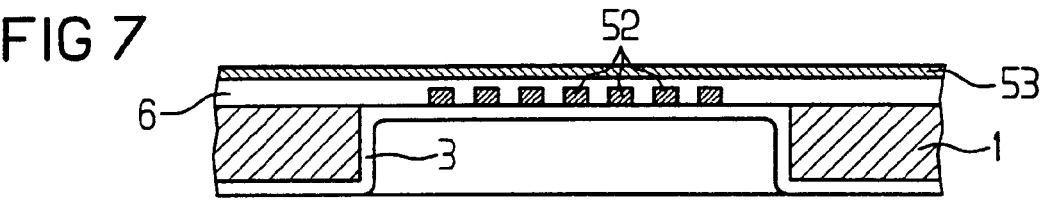
FIG. 7 shows the production of microstructures in two planes.

It is also possible to span self-supporting microstructures in a number of planes over a supporting frame 1. For example, FIG. 7 shows a configuration comprising auxiliary layer 3 and supporting frame 1, on whose common plane microstructures 52 have firstly been produced in the manner outlined. These microstructures 52 run at right angles to the plane of the drawing in the example shown. Following the completion of the microstructures 52, a spacer layer 6 is applied, and microstructures 53 are produced on the latter in a second structure plane. These microstructures 53 in the exemplary embodiment illustrated run parallel to the plane of the drawing and at right angles to the microstructures 52. The spacer layer 6 is then likewise removed following the removal of the auxiliary layer 3. In this case, only those areas of the spacer layer 6 which are located between the microstructures 53 and the supporting frame 1 are maintained.

Figure 8:
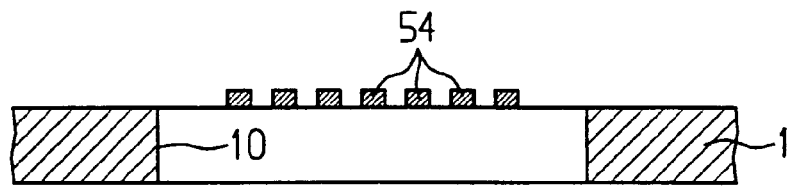
FIG. 8 shows the production of microstructures applied directly to the supporting frame.

Following the additive or subtractive production of microstructures, the auxiliary layer 3, which has provided support up to this point, is then removed. For the auxiliary layer 3 and the supporting frame 1, metals are preferably selected which permit the auxiliary layer 3 to be etched away wet chemically in a selective manner with respect to the supporting frame 1. Since the etching contours are fixed, etching can be carried out in a dip bath without movement and in such a gentle manner that the microstructures, which are now self-supporting, remain undamaged. FIG. 8 shows microstructures 54 spanned directly onto the supporting frame 1 following the removal of the auxiliary layer 3.

For the production of membranes, inorganic dielectric layers can be deposited in a known way, by means of CVD (chemical vapor deposition) or PVD (physical vapor deposition), onto the common plane of the assembly shown in FIG. 4 comprising auxiliary layer 3 and supporting frame 1. Organic dielectrics composed of polyimide, benzocyclobutene, polybenzoxazol or the like can be applied by sputtering on or spraying on from liquid solution and subsequently hardened. After the auxiliary layer 3 has been etched away, the self-supporting membranes produced in this way are then spanned over the supporting frame 1.

Figure 9:
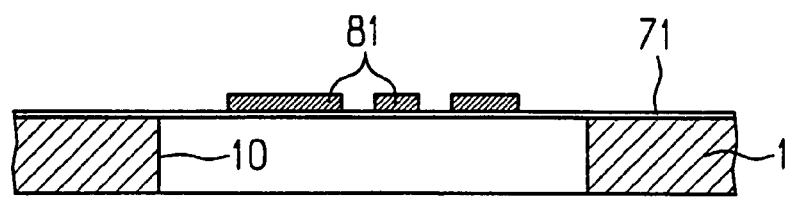
FIG. 9 shows a first embodiment of a circuit formed on a self-supporting dielectric membrane.
Figure 10:
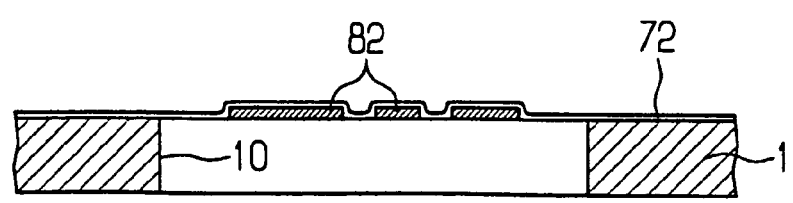
FIG. 10 shows a second embodiment of a circuit formed on a self-supporting dielectric membrane.

If circuits are to be produced on self-supporting dielectric membranes, the exemplary embodiment of FIGS. 9 and 10 are suitable.

In the first possible way, illustrated in FIG. 9, first of all a dielectric membrane 71 is applied to the auxiliary layer 3 (cf. FIG. 4). Following metallization over the entire area, circuit elements 81 can be produced either additively by means of metal deposition by electroplating or subtractively by means of etching. In order to finish the circuit illustrated in FIG. 9, the auxiliary layer 3 is then etched away wet chemically in a selective manner with respect to the supporting frame 1.

In the second possible way, illustrated in FIG. 10, the circuit elements, designated by 82 here, are produced directly on the auxiliary layer 3. The dielectric membrane 72 that is subsequently applied is then located over the circuit elements 82 and embeds the latter from three sides. In order to finish the circuit illustrated in FIG. 10, the auxiliary layer 3 is then etched away wet chemically in a selective manner with respect to the supporting frame 1.

In the variant illustrated in FIG. 10, the circuit elements 82 can be built up, for example, by means of a sequence of layers comprising adhesive layer, diffusion barrier and conductive layer. Following the removal of the auxiliary layer 3 (cf. FIG. 4), one or more of these layers can then be etched away again. In this way, it is possible, for example, to produce circuit elements 82 of pure gold on the dielectric membrane 72.

EXAMPLE 1

For a device for measuring weak gas flows, self-supporting metal webs are produced over openings in thin glass. The supporting frame is produced from 0.3 mm thick borosilicate glass, into which the openings are introduced by means of sand blasting. The format of the multiple arrangement is 4×4 inches. The openings and the self-supporting areas have dimensions of 1×1 mm$^2$. The adhesive film used is a 75 µm thick commercially available dry resist film. The auxiliary layer consists of 25 µm thick copper. The self-supporting microstructures produced by means of depositing nickel by electroplating are webs which are 13 µm wide and 6 µm thick and have a separation pitch of 39 µm.

EXAMPLE 2

To produce an electric circuit, a supporting frame is cut out of a 0.3 mm thick sheet of vanadium steel, using the laser. The adhesive film used is a 75 µm thick dry resist film which, according to FIG. 5, is applied to an auxiliary layer of glass. The auxiliary layer consists of 50 µm thick copper. The openings in the supporting frame can have, for example, dimensions of 8×13 mm$^2$ or 33×4 mm$^2$. The dielectric membrane is produced by sputtering on liquid PBO (polybenzoxazol) at a thickness of 3 µm. The circuit elements formed on the dielectric membrane consist of a sequence of layers of titanium, palladium and gold.

The microstructures produced in accordance with FIGS. 1 to 6 and Example 1 can be used as electrically heatable resistance grids in a device for measuring weak gas flows. A device of this type, disclosed in the above-noted German patent DE 15 73 098, is illustrated in FIG. 11. The device is an infrared gas analysis appliance operating on the alternating light principle, which has two receiver chambers K1 and K2, the chamber K1 being in the measuring beam path and the chamber 2 being in the comparison beam path or reference beam path. The chambers K1 and K2 are filled with the same type of gas and are connected to each other via a tube R. The periodic pressure fluctuations which occur in the chambers K1 and K2 in the measurement method based on the alternating light principle result in an oscillating gas flow in the connecting tube R, the frequency of the pulsating gas column normally lying in the order of magnitude of 10 Hz. Arranged in the connecting tube R, at right angles to the flow direction, are two flat resistance grids WG1 and WG2 made of temperature-sensitive, electrically conductive material. The dimensions of the two resistance grids WG1 and WG2 are 1 µm×1 µm, their spacing about 200 µm. The two resistance grids WG1 and WG2 form branches of a bridge circuit which, in addition, further has the adjustable resistors W1 and W2. A constant voltage source KS in one bridge diagonal heats up the resistance grids WG1 and WG2 to a temperature of, for example, about 200° C. Connected to the measurement diagonal of the bridge is an amplifier V of simple design, whose output is connected to an indicating or evaluating measuring instrument M.

The two resistance grids WG1 and WG2 shown only schematically in FIG. 11 are produced as self-supporting microstructures on appropriate supporting frames TR1 and TR2, corresponding to FIGS. 1 to 6 and example 1. The section shown in FIG. 12 reveals that the two supporting frames TR1 and TR2 are connected to each other by a frame-like spacer D, the thickness of this spacer D defining the distance between the resistance grids WG1 and WG2. In the exemplary embodiment shown, the spacer D has been produced from a 200 µm thick dry resist film. The two supporting frames TR1 and TR2 connected via the spacer D, together with the resistance grids WG1 and WG2, form an insert that can be inserted into the connecting tube R according to FIG. 11. The gas to be measured flowing through the resistance tube R is indicated in FIG. 12 by arrows MG.

FIG. 12 also shows that the supporting frame TR1 and the spacer D are provided with recesses, not specifically designated, which permit electrical contact to be made easily with the corresponding contacting surfaces of the resistance grids WG1 and WG2. Making this electrical contact is indicated in FIG. 12 by arrows KO1 and KO2.

Figure 13:
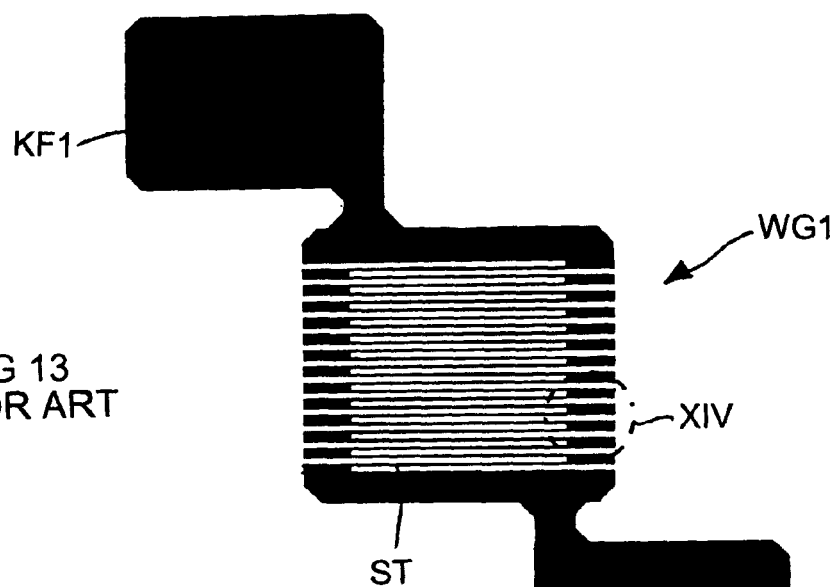
FIG. 13 shows a plan view of the serpentine structure of the first resistance grid according to FIG. 12.
Figure 14:
FIG. 14 shows the detail XIV according to FIG. 13.
Figure 15:
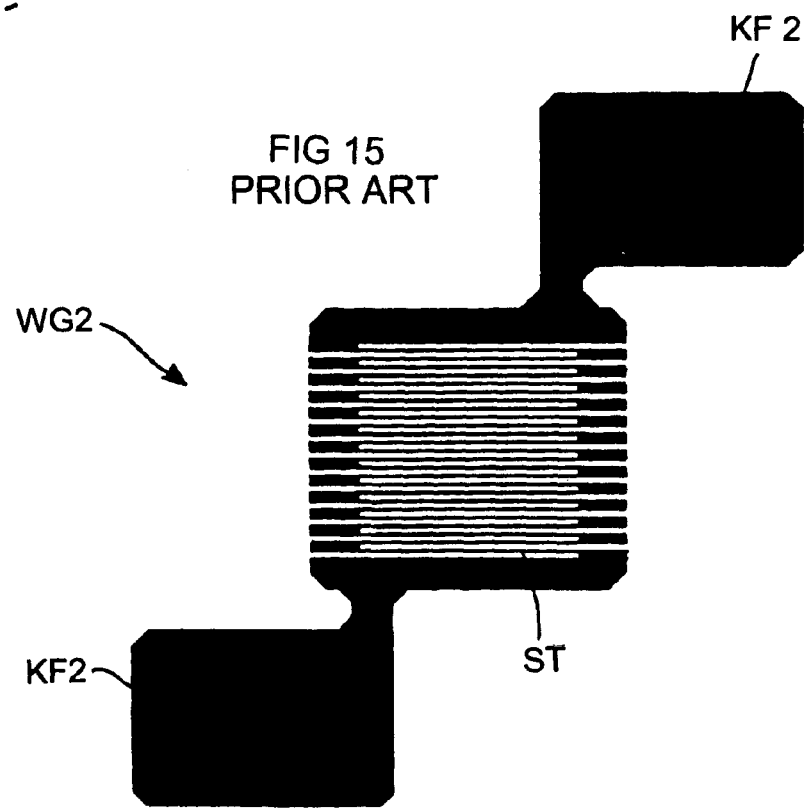
FIG. 15 shows a plan view of the serpentine structure of the second resistance grid according to FIG. 12.

The actual configuration of the contacting surfaces KF1 of the resistance grid WG1 and of the contacting surfaces KF2 of the resistance grid WG2 can be seen from FIGS. 13 and 15. In addition to the rectangular shape of the contacting surfaces KF1 and KF2, these two figures also reveal the serpentine course of the webs ST of the resistance grids WG1 and WG2, FIG. 14, as a detail XIV from FIG. 13, showing the design of the webs ST very clearly. In the resistance grids WG1 and WG2 which, when they are installed, are arranged in mirror-image fashion in relation to each other, there are in each case twenty-five webs ST consisting of nickel, each of which has a width of 18 µm and has a height, measured at right angles to the plane of the drawing, of 4.2 µm. The pitch spacing of the webs ST is 39 µm.

According to FIG. 12, the heated resistance grids WG1 and WG2 are opposite each other at a short distance of, for example, 200 µm. The heat carried away by the gas to be measured flowing through has the effect of changing the electrical resistance in the resistance grids WG1 and WG2. This change is a measure of the mass flow and of the type of gas.

In addition to the temperature coefficient of the material used for the resistance grids WG1 and WG2, the geometric precision of the construction is primarily responsible for the magnitude and the accuracy of the measuring signal. The production method described for the resistance grids WG1 and WG2 therefore permits a strong signal and accurate measurements. As a result of the high uniformity of the resistance grids among one another, the drive electronics can also be simplified. Finally, it should also be emphasized that the production method described permits cost-effective production in multiple arrangement, for example the production of 500 resistance grids on 4 inch×4 inch.

I claim:

1. A method of measuring a weak gas flow, which comprises:
   producing an assembly of self-supporting microstructures by:
   a) providing a supporting frame with at least one opening;
   b) applying, on the supporting frame, an adhesive film spanning the opening in the supporting frame flatly;
   c) applying an auxiliary layer on an underside of the adhesive film and adjacent regions of the supporting frame with the auxiliary layer spanning the opening in the supporting frame on one side flush with the supporting frame;
   d) removing the adhesive film;
   e) constructing microstructures on the common plane including the auxiliary layer and the supporting frame; and
   f) removing the auxiliary layer formed in step c);
   integrating the self-supporting microstructures configured as electrically heatable resistance grids in a device for measuring weak gas flows; and
   exposing the resistance grids to the weak gas flow and measuring the weak gas flow.

2. The method according to claim 1, which comprises placing the resistance grids in thermal contact with the gas flow through the device, and providing a bridge circuit with the resistance grids connected therein, the bridge circuit having a first diagonal with a constant current source and a second diagonal with instruments configured to process measured values or display measured values.

3. The method according to claim 1, which comprises providing the device with a first chamber and a second chamber and a connecting tube therebetween, and disposing the resistance grids in the connecting tube between the first chamber and the second chamber and perpendicular to a flow direction at a distance from each other.

4. The method according to claim 1, which comprises forming the resistance grids with a serpentine configuration.

5. The method according to claim 1, which further comprises placing a frame-type spacer between the resistance grids and defining a distance therebetween.

6. The method according to claim 1, which further comprises disposing the resistance grids on supporting frames of glass.

* * * * *